(12) United States Patent
Del Prado Pavon et al.

(10) Patent No.: US 8,737,312 B2
(45) Date of Patent: May 27, 2014

(54) METHOD TO IMPROVE THROUGHPUT AND POWER CONSUMPTION EFFICIENCY IN WIRELESS COMMUNICATION SYSTEMS

(75) Inventors: Javier Del Prado Pavon, Ossining, NY (US); Joerg Habetha, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 1291 days.

(21) Appl. No.: 11/572,045

(22) PCT Filed: May 2, 2005

(86) PCT No.: PCT/IB2005/051425
§ 371 (c)(1),
(2), (4) Date: Jan. 12, 2007

(87) PCT Pub. No.: WO2005/107182
PCT Pub. Date: Nov. 10, 2005

(65) Prior Publication Data
US 2010/0165925 A1   Jul. 1, 2010

Related U.S. Application Data

(60) Provisional application No. 60/567,978, filed on May 4, 2004, provisional application No. 60/599,433, filed on Aug. 6, 2004.

(51) Int. Cl.
*H04W 4/00*    (2009.01)
*H04W 72/04*   (2009.01)

(52) U.S. Cl.
CPC ................................ *H04W 72/042* (2013.01)
USPC .......................................... 370/329; 455/574

(58) Field of Classification Search
USPC ................. 370/329, 338, 347, 468, 477, 341, 370/395.4; 455/574
See application file for complete search history.

(56) References Cited

U.S. PATENT DOCUMENTS

| | | | |
|---|---|---|---|
| 5,598,417 A | 1/1997 | Crisler et al. | |
| 7,251,226 B2 * | 7/2007 | Lindsay et al. | 370/331 |
| 2001/0004356 A1 * | 6/2001 | Faber | 370/335 |
| 2002/0080750 A1 | 6/2002 | Belcea | |
| 2002/0105970 A1 | 8/2002 | Shvodian | |
| 2003/0067906 A1 * | 4/2003 | Young | 370/347 |
| 2004/0114563 A1 * | 6/2004 | Shvodian | 370/347 |
| 2004/0253996 A1 * | 12/2004 | Chen et al. | 455/574 |
| 2005/0053043 A1 * | 3/2005 | Rudolf et al. | 370/337 |
| 2005/0128988 A1 * | 6/2005 | Simpson et al. | 370/338 |
| 2005/0249173 A1 * | 11/2005 | Salokannel et al. | 370/338 |
| 2007/0135159 A1 * | 6/2007 | Sinivaara | 455/552.1 |

* cited by examiner

*Primary Examiner* — Kan Yuen
(74) *Attorney, Agent, or Firm* — Larry Liberchuk

(57) ABSTRACT

In accordance with an example embodiment, method of wireless communication includes sending a beacon frame (300), which includes at least one availability information element (AIE) (400, 404). The method also includes scheduling transmission and reception of traffic among a plurality of devices (101, 103), or systems (101, 103), or both based on the AIES from the receivers. A wireless network (100) is also disclosed.

14 Claims, 3 Drawing Sheets

METHOD TO IMPROVE THROUGHPUT AND POWER CONSUMPTION EFFICIENCY IN WIRELESS COMMUNICATION SYSTEMS

The wireless communication bandwidth has significantly increased with advances of channel modulation techniques, making the wireless medium a viable alternative to wired and optical fiber solutions. As such, the use of wireless connectivity in data and voice communications continues to increase. These devices include mobile telephones, portable computers in wireless networks (e.g., wireless local area networks (WLANS), stationary computers in wireless networks, portable handsets, to name only a few.

Each wireless network includes a number of layers and sub-layers, such as the Medium Access Control (MAC) sub-layer and the Physical (PHY) layer. The MAC layer is the lower of two sublayers of the Data Link layer in the Open System Interconnection (OSI) stack. The MAC layer provides coordination between many users that require simultaneous access to the same wireless medium.

The MAC layer protocol includes a number of rules governing the access to the broadcast medium that is shared by the users within the network. As is known, several different multiple access technologies (often referred to as MAC protocols) have been defined to work within the protocols that govern the MAC layer. These include, but are not limited, to Carrier Sensing Multiple Access (CSMA), Frequency Division Multiple Access (FDMA) and Time Division Multiple Access (TDMA).

While standards and protocols have provided for significant improvement in the control of voice and data traffic, the continued increase in the demand for network access at increased channel rates while supporting quality-of-service (QoS) requirements have required a continuous evaluation of protocols and standards and changes thereto. For example, many known protocols such as the Multiband Orthogonal Frequency Multiple Access Alliance (MBOA) MAC Draft 5.0, lack support for sharing availability information for devices in a distributed wireless networks with asynchronous traffic that make use of the contention-based access enhanced distributed channel access (EDCA) or the Distributed Reservation Protocol (DRP). One illustrative area where this results in shortcomings is in power consumption management efficiency for the devices of the network or lack of information for correctly calculating appropriate times for establishing a new DRP connection. Ultimately, these drawbacks result in reduced throughput and delay inefficiency.

What is needed, therefore, is a method and apparatus that substantially overcomes at least the shortcomings of known methods described.

In accordance with an example embodiment, method of wireless communication includes providing at least one availability information element (AIE). The method also includes scheduling transmission and reception of traffic among a plurality of devices, or systems, or both based on the AIEs from the receivers.

In accordance with another example embodiment, a wireless network includes a plurality of wireless elements, wherein the network is adapted to provide at least one availability information element (AIE), and the plurality of wireless elements schedule transmission and reception of traffic based on the AIE.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 1:
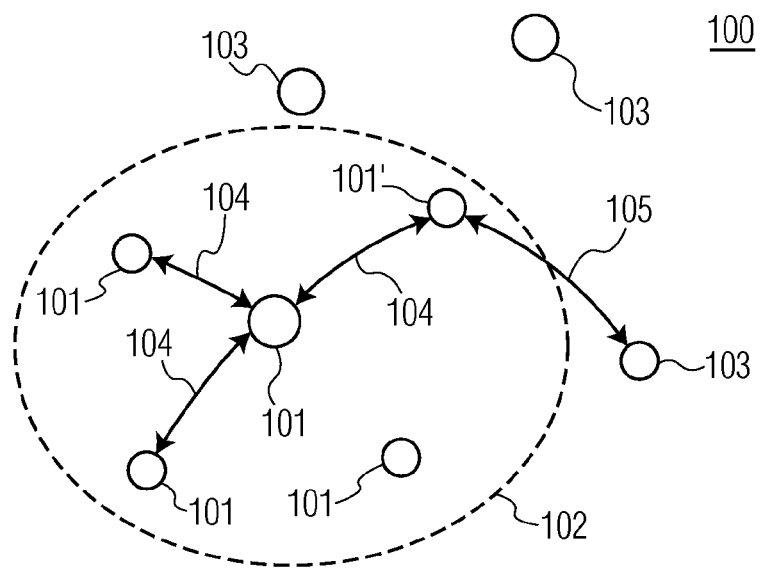
FIG. 1 is a diagram representative of wireless communication networks sharing a medium in accordance with an example embodiment.

In the following detailed description, for purposes of explanation and not limitation, example embodiments disclosing specific details are set forth in order to provide a thorough understanding of the example embodiments. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the present invention. Nonetheless, such devices, methods, systems and protocols that are within the purview of one of ordinary skill in the art may be used in accordance with the example embodiments. Finally, wherever practical, like reference numerals refer to like features.

Briefly, in accordance with illustrative embodiments, methods and apparati are described that improve the efficiency and throughput in a distributed wireless network. The methods and apparati include providing at least one AIE during the beacon period. The AIEs includes the availability of devices/systems of the network during an impending superframe. In this manner, each device provides its availability over the superframe, facilitating the exchange of traffic between the devices/systems of the network.

In accordance with the example embodiments described herein, distributed wireless networks operate under MBOA Draft 0.5. Of course, this is merely illustrative, and other MAC protocols may incorporate the sharing of availability of the devices within the network that are described in connection with the example embodiments. These include, but are not limited to, the progeny of the current MBOA MAC protocol, as well as other carrier sense multiple access with collision avoidance (CSMA/CA) protocols or Time Division Multiple Access (TDMA) protocols. It is emphasized that these protocols are merely illustrative and that other protocols within purview of one of ordinary skill in the art may be implemented in accordance with the example embodiments.

FIG. 1 is a schematic diagram of a wireless network that includes plurality of wireless devices or systems sharing a communications medium (i.e., co-existing) in accordance with an example embodiment. Wireless devices/systems 101 may transmit or receive (or both) traffic 104 to from other wireless devices 101 within their transmission range 102. Moreover, there may be other wireless devices/systems 103 that are outside the range 102 of certain wireless devices/systems 101, but within the range of certain devices 101'. As such, while traffic 105 may be transmitted between certain devices/systems 101' and 103, devices/systems 103 may be hidden from other devices 101. As will become clearer as the present description continues, interference with the traffic 105 may be avoided through the methods and apparati of the example embodiments.

Figure 2:
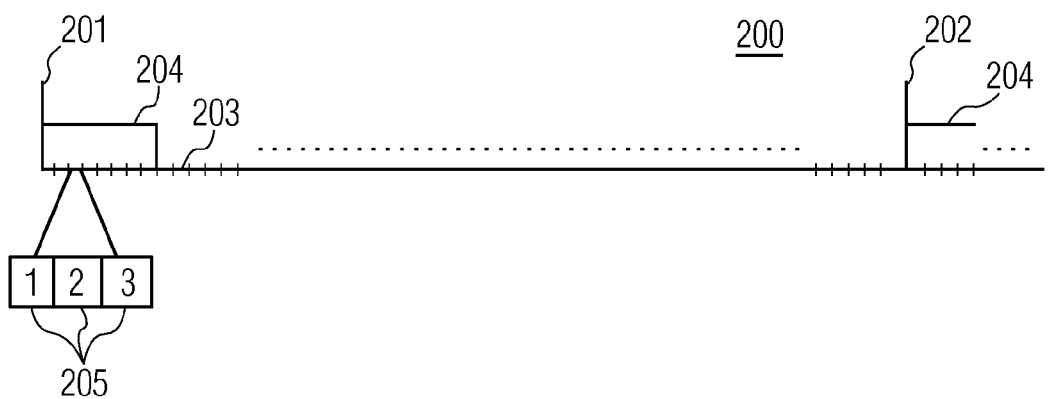
FIG. 2 is a time-line of a superframe in accordance with an example embodiment.

FIG. 2 is a time line 200 of a superframe between a first beacon 201 and a second beacon 202. As used herein, the starting point of the beacons is referred to as the Beacon Period Start Time (BPST), and there is a prescribed period of time between beacons. In an example embodiment, the superframe is divided into a plurality of medium access slots (MAS's) 203, which provide for organized transmission and reception in keeping with the example embodiments. In an illustrative embodiment, there are 256 slots 203, with each slot having a duration of approximately 256 μs, so the entire duration of the superframe is approximately 65.53 ms in the example embodiment (thus 65.53 ms between BPSTs). Of course the number and duration of the slots 203 is merely for purposes of illustration and are in no way limitations of the slots 203.

At the beginning of each superframe there is a beacon interval 204. As will become clearer as the present description continues, the beacon interval 204 provide the vehicle for the sharing of availability information of the devices/systems (e.g., devices 101, 103) of the network 100, as well as the needs of devices/systems to send traffic to other devices/systems of the wireless network 100 of the example embodiments.

Each beacon interval comprises a certain number of slots. This number may be static over a particular service interval; or may be dynamic over the service interval. To wit, in accordance with an example embodiment, the number of slots 203 in each beacon interval 204 of each superframe of a service interval may be fixed. Alternatively, in another example embodiment, the number of slots 203 in a beacon interval 204 may be variable to accommodate the needs of the devices of a superframe of a service interval. For purposes of illustration, the fixed duration beacon interval may be comprised of 8 MASs 203; and in a variable duration beacon interval, the number of MASs may be at most 20 MASs 203. Of course, this is only illustrative of the example embodiments. Finally, it is noted that within each slot 203 of a beacon interval 204, there are a certain number of beacons 205. Illustratively, there are three beacons 205. As such, in a static beacon interval there may be 24 beacons, and in a dynamic beacon interval, there may be 60 beacons.

Figure 3:
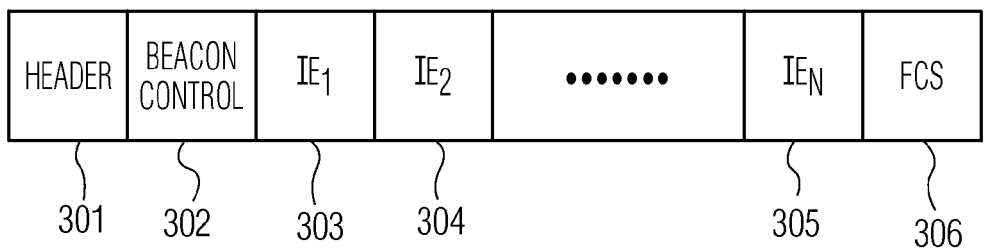
FIG. 3 is a beacon frame in accordance with an example embodiment.

FIG. 3 shows a beacon frame 300 in accordance with an illustrative embodiment. The beacon frame 300 may be one of the beacons 205 described in conjunction with the example embodiments of FIG. 2. The beacon frame 300 includes a header 301, a beacon control frame 302 and a plurality of information elements IE, 303, $IE_2$ 304, . . . , $IE_k$ 305 (k=positive integer) 303-305. The beacon 300 concludes with a frame check sequence (FCS) 306, which is well-known in the art.

Illustratively the plurality of IEs ($IE_1$ 303, $IE_2$ 304, $IE_k$ 305) each may be a traffic indication map (TIM) or an availability IE. In an example embodiment, the availability IE provides information of a device's/system's availability, or other IE. For example, the availability IE may provide information on the system's/device's power save interval, neighbor's (e.g., hidden neighbor's) reservations of traffic, scanning scheduling information, or scanning channel information, to name only a few possibilities.

The IEs 303-305 each include information of the device or system. To wit, the IE may include a TIM, which indicates the desired scheduling of transmission from one device/system to another. The IE may also include the availability of a particular device/system to receive traffic. As will become clearer as the present description continues, the availability of each slot 203 for each device/system participating in the superframe may be provided within the IE. Moreover, by populating the beacon element with the IEs, the information for scheduling traffic among the devices/systems of the network 100 may be efficiently effected, resulting in a significant improvement in efficiency and throughput, to name only a few benefits.

Figure 4A:
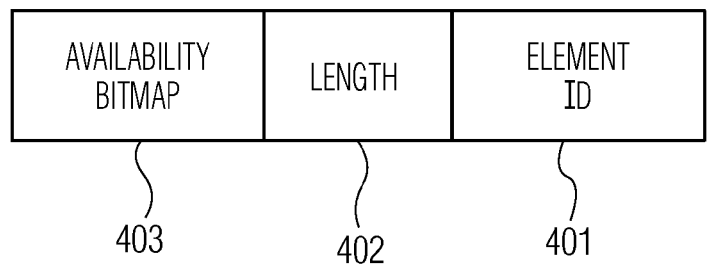
FIG. 4a is an availability information element (IE) of a beacon frame in accordance with an example embodiment.

In an example embodiment, during the beacon period 204, the beacon frame 300 is provided through the individual information elements (i.e., IEs 303-305 of the beacon element 300). A beacon frame 300 may include an availability IE 400, or availability IE 404, which are shown in the example embodiments of FIGS. 4a and 4b, respectively.

The availability IE 400 includes an element ID 401, a length field 402, and an availability bitmap 403. The element ID 401 includes the type of information element to which the IE 400 pertains. For example, the element ID 401 may be an availability IE, a TIM or other element that provides the information about the device.

The availability IE 400 also includes a length field 402. The length field indicates the length, in bytes of the IE. The availability IE 400 also includes an availability bitmap 403, which is illustratively 256 bits in length. Each bit of the bitmap 403 includes a binary digit (bit) that is indicative of the availability of the device/system for each MAS of the superframe. Illustratively, a '0' bit indicates that the device is available during a particular MAS; and a '1' bit indicates that the device/system is not available during a particular MAS. It is noted that the MAS may be marked as unavailable (e.g., a '1') for a variety of reasons such as Power Save modes, reservations of neighbors, other Beacon Periods, to name only a few.

Figure 4B:
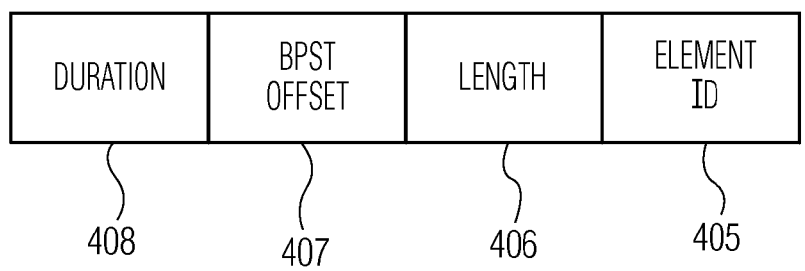
FIG. 4b is an availability IE of a beacon frame in accordance with an example embodiment.

FIG. 4b is an availability IE 404 in accordance with another example embodiment. The IE 404 shares a number of common characteristics with the IE 400 of the example embodiment of FIG. 4a; these common traits will not be repeated so as not to obscure the description of the present example embodiment.

The IE 404 includes an element ID 405, a length field 406, a beacon period start time (BPST) offset 407, and duration field 408, which equates to the length field 402 described previously.

In the present example embodiment, the BPST offset field 407 defines the starting time of the available interval of time for reception of traffic. This is the interval of time during the superframe that the wireless device or wireless system is available. The BPST offset filed 407 is set to the slot number of the first slot of the available interval. The duration field 408 contains, in multiples of data slots, the duration of the available interval. This example embodiment provides a method to signal availability that, among other benefits, provides efficiency when there is a relatively low number of available intervals, since the length of the IE 404 may be comparatively small.

As can be readily appreciated, relating back to the network 100 of the example embodiment of FIG. 1, through the availability IE's 400, 404 of the example embodiments each device/system 101',101, 103 of the network 100 can populate the beacon frame 300 with its availability for the superframe. This information is exchanged during the beacon period 204, and thus each device/element can inform the other devices/systems of the network 100 of their availability; and thus can be informed of the availability of the other devices/systems 101', 101, 103. In this manner the scheduling issues that plague known networks can be substantially avoided by the example embodiments.

Figure 5:
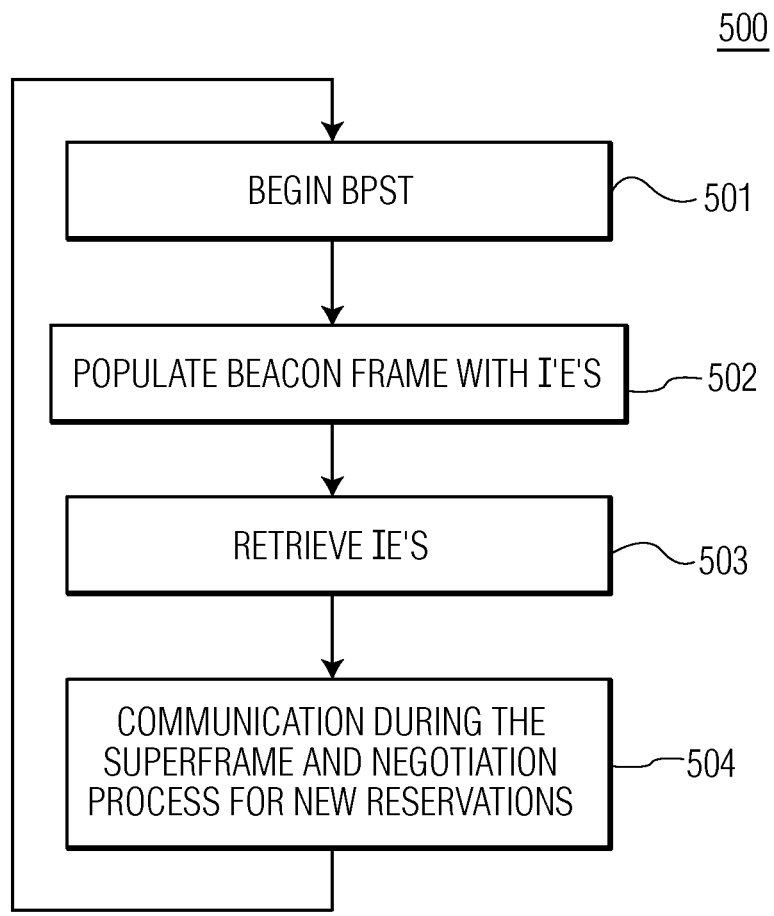
FIG. 5 is a method of setting the availability for a device in accordance with an example embodiment.

FIG. 5 is a flow chart of a method 500 of communicating in a wireless network in accordance with an example embodiment. The method 500 begins at step 501, where the BPST commences. During the beacon period following the BPST, the various devices/systems send beacons with IE's for the present superframe. During step 502, the beacon frame is populated with the information of the beacons delivered from the various devices/systems of the network. To wit, during step 502, the individual availability elements (e.g. elements 400, 404) are provided via the beacons and serve to populate the beacon frame 300 with information on TIMs and other availability during the superframe.

After each device/system has provided its availability IE, each device has had the opportunity to retrieve the availability IE of all device/systems in the network that will be participating in the superframe. As such, in step 504 the communication during the superframe and the negotiation process for new reservations are carried out. This negotiation is, for example, the reservation of bandwidth by devices requiring isochronous services. These negotiation processes are well known in the art. For example, details of this negotiation process are provided for in the M.B.O.A. protocol. Upon completion of the superframe, the process is repeated at the next BPST at step 501.

In view of this disclosure it is noted that the various methods and devices described herein can be implemented in hardware and software known to achieve efficient medium access and sharing in a distributed wireless network. Further, the various methods and parameters are included by way of example only and not in any limiting sense. In view of this disclosure, those skilled in the art can implement the various example devices and methods in determining their own techniques and needed equipment to effect these techniques, while remaining within the scope of the appended claims.

The invention claimed is:

1. A method of wireless communication, the method comprising:
   providing an availability information element (AIE) including an availability bitmap during a beacon period of a wireless network; and
   scheduling transmission and reception of traffic on the wireless network among a plurality of devices, or systems, or both, based on the AIE,
   wherein the availability bitmap provides a bit for each device or system indicative of the availability of the corresponding one of the plurality of devices or systems during a medium access slot (MAS) of a superframe.

2. A method as recited in claim 1, wherein a beacon interval begins the superframe.

3. A method as recited in claim 1, wherein the AIE includes a beacon period start time (BPST) offset and a duration.

4. A method as recited in claim 1, wherein the AIE provides information about a power save mode period.

5. A method as recited in claim 1, wherein the AIE indicates scanning scheduling.

6. A method as recited in claim 1, wherein the AIE indicates communication from hidden neighbors.

7. A method as recited in claim 1, wherein a '0' bit indicates availability during a MAS and a '1' bit indicates lack of availability during a MAS.

8. A wireless network, comprising:
   a plurality of wireless elements, wherein the network is adapted to provide an availability information element (AIE) including an availability bitmap during a beacon period of the wireless network, and the wireless elements schedule transmission and reception of traffic based on the AIE,
   wherein the availability bitmap provides a bit for each of the plurality of wireless elements indicative of the availability of the corresponding one of the plurality of wireless elements during a medium access slot (MAS) of a superframe.

9. A wireless network as recited in claim 8, wherein the wireless elements are selected from the group consisting of wireless devices and wireless systems.

10. A wireless network as recited in claim 8, wherein a beacon interval begins the superframe.

11. A wireless network as recited in claim 8, wherein the AIE provides information about a power save mode period.

12. A wireless network as recited in claim 8, wherein the AIE indicates scanning scheduling.

13. A wireless network as recited in claim 8, wherein the AIE indicates communication from hidden neighbors.

14. A wireless network as recited in claim 8, wherein the AIE includes a beacon period start time (BPST) offset and a duration.

* * * * *